United States Patent
Eckert et al.

(10) Patent No.: US 9,520,910 B1
(45) Date of Patent: Dec. 13, 2016

(54) RECEIVER COMPONENT AND METHOD FOR ENHANCING A DETECTION RANGE OF A TIME-TRACKING PROCESS IN A RECEIVER

(71) Applicant: NXP B.V., Eindhoven (NL)

(72) Inventors: Sebastian Eckert, Burgstaedt (DE); Martin Kessel, Dresden (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/863,572

(22) Filed: Sep. 24, 2015

(51) Int. Cl.
*H04B 1/16* (2006.01)
*H04L 5/00* (2006.01)
*H04L 27/26* (2006.01)

(52) U.S. Cl.
CPC .............. *H04B 1/16* (2013.01); *H04L 5/0007* (2013.01); *H04L 27/2613* (2013.01)

(58) Field of Classification Search
CPC ............. H04L 27/2656; H04L 27/2657; H04L 27/2662; H04L 5/0023; H04L 27/2614; H04L 7/0008; H04L 27/2271; H04L 27/2275; H04L 27/3818; H04L 2027/0024; H04L 25/03273; H04L 27/0014; H04L 27/2613; H04L 27/233; H04L 27/2663
USPC ....... 375/142–143, 260, 267, 325, 326, 340, 375/343, 354
See application file for complete search history.

(56) References Cited

U.S. PATENT DOCUMENTS

| | | | | |
|---|---|---|---|---|
| 4,561,068 A * | 12/1985 | Kindler | .................. | H04B 1/123 708/813 |
| 5,140,617 A * | 8/1992 | Kubo | ...................... | H04L 7/042 375/365 |
| 5,727,018 A * | 3/1998 | Wolf | ........................ | H04L 7/043 370/515 |
| 6,088,383 A * | 7/2000 | Suzuki | ............... | H04B 1/71075 375/144 |
| 6,594,201 B2 * | 7/2003 | Barnard | ................ | G01S 3/8086 342/368 |
| 6,753,950 B2 * | 6/2004 | Morcom | .................. | G01S 17/32 342/145 |
| 6,774,829 B2 * | 8/2004 | Nakada | ............... | H04L 27/2675 341/126 |
| 6,778,591 B2 * | 8/2004 | Sato | .................... | H04B 1/70754 375/140 |
| 6,788,736 B1 * | 9/2004 | Kawama | ............ | H03H 17/0254 375/152 |
| 6,859,641 B2 * | 2/2005 | Collins | ............. | H04B 7/18513 455/139 |
| 7,054,452 B2 * | 5/2006 | Ukita | ....................... | H04N 7/15 348/E7.083 |
| 7,149,266 B1 * | 12/2006 | Imamura | ............. | H04L 27/2657 375/142 |
| 7,206,255 B2 * | 4/2007 | Ukita | ....................... | H04N 7/15 367/38 |
| 7,298,780 B2 * | 11/2007 | Zhengdi | .................. | G01S 19/21 375/150 |

(Continued)

*Primary Examiner* — Emmanuel Bayard
(74) *Attorney, Agent, or Firm* — Rajeev Madnawat (57) ABSTRACT

A receiver component and a method for enhancing a detection range of a time synchronization process in a receiver utilize multiple cross-correlations of a received signal with a known preamble sequence. The results of the multiple cross-correlations are divided into delay segments. The delay segments of one of the multiple cross-correlations are compared with the delay segments of another of the multiple cross-correlations to determine delay of the delay segments of the one of the multiple cross-correlation results.

20 Claims, 7 Drawing Sheets

(56) References Cited

U.S. PATENT DOCUMENTS

| | | | | |
|---|---|---|---|---|
| 7,336,738 B2* | 2/2008 | Wakamatsu | H04L 27/2656 | 370/335 |
| 7,352,778 B2* | 4/2008 | Labs | H04J 3/0608 | 370/503 |
| 7,366,089 B2* | 4/2008 | Tehrani | H04B 7/0848 | 370/208 |
| 7,426,232 B2* | 9/2008 | Matsuoka | H04B 7/082 | 375/148 |
| 7,447,259 B2* | 11/2008 | Betz | H04B 1/70752 | 375/142 |
| 7,480,235 B2* | 1/2009 | Fujii | H04L 27/2607 | 370/208 |
| 7,486,751 B1* | 2/2009 | Pare, Jr. | H04B 7/0413 | 375/260 |
| 7,545,891 B1* | 6/2009 | Pare, Jr. | H04L 5/0007 | 375/344 |
| 7,551,692 B2* | 6/2009 | Kim | H04H 40/27 | 375/142 |
| 7,561,629 B2* | 7/2009 | Miyatani | H04L 5/06 | 330/149 |
| 7,672,220 B2* | 3/2010 | Tehrani | H04B 7/0848 | 370/208 |
| 7,769,095 B2* | 8/2010 | Wenzhen | H04L 27/2657 | 327/147 |
| 7,778,363 B2* | 8/2010 | Inagawa | H04L 7/0058 | 370/509 |
| 7,809,020 B2* | 10/2010 | Douglas | H04W 24/00 | 370/474 |
| 7,830,949 B2* | 11/2010 | Mehrnia | H04B 1/707 | 375/142 |
| 7,830,973 B2* | 11/2010 | Cho | H04L 27/2656 | 375/260 |
| 7,920,599 B1* | 4/2011 | Subramanian | H04W 56/0085 | 370/292 |
| 8,059,701 B2* | 11/2011 | Tung | H04L 25/0224 | 370/477 |
| 8,068,389 B2* | 11/2011 | Kobayashi | G11B 7/0906 | 369/44.25 |
| 8,073,084 B1* | 12/2011 | Giallorenzi | H04B 1/7075 | 375/130 |
| 8,085,637 B2* | 12/2011 | Hosokawa | G11B 7/0906 | 369/44.41 |
| 8,169,993 B2* | 5/2012 | Huang | H04B 17/309 | 370/343 |
| 8,184,816 B2* | 5/2012 | Ramakrishnan | H04R 3/005 | 381/56 |
| 8,344,947 B2* | 1/2013 | Tocker | G01S 19/22 | 342/357.61 |
| 8,358,644 B2* | 1/2013 | Baxley | H04B 1/59 | 370/350 |
| 8,503,579 B2* | 8/2013 | Furukawa | H04L 25/0216 | 375/340 |
| 8,542,718 B2* | 9/2013 | Weill | G01S 19/254 | 342/357.68 |
| 8,625,697 B2* | 1/2014 | Chiang | H04L 25/03891 | 375/260 |
| 8,649,470 B2* | 2/2014 | Kobylinski | H04L 25/0204 | 375/341 |
| 8,717,954 B2* | 5/2014 | Nakayama | H04W 56/0085 | 370/310 |
| 8,842,498 B2* | 9/2014 | Cahalan | H04B 13/02 | 367/124 |
| 8,995,587 B1* | 3/2015 | Zhang | H04B 7/0417 | 370/334 |
| 9,049,091 B2* | 6/2015 | Bai | H04L 27/3863 | |
| 9,065,630 B1* | 6/2015 | Xiao | H04L 7/042 | |
| 9,203,449 B2* | 12/2015 | Matsubara | H04B 1/0475 | |
| 9,270,323 B2* | 2/2016 | Goldberg | H04B 1/70735 | |
| 9,307,318 B2* | 4/2016 | Anderton | H04R 3/02 | |
| 2002/0085652 A1* | 7/2002 | Okubo | H04L 27/2332 | 375/344 |
| 2006/0267811 A1* | 11/2006 | Tan | G01R 13/0272 | 341/51 |
| 2009/0232234 A1* | 9/2009 | Du | H04B 7/2621 | 375/260 |
| 2009/0323980 A1* | 12/2009 | Wu | H04R 3/005 | 381/92 |
| 2010/0303179 A1* | 12/2010 | Inagawa | H04L 7/0058 | 375/343 |
| 2014/0112398 A1* | 4/2014 | Kamalizad | H04L 27/2655 | 375/257 |
| 2014/0278214 A1* | 9/2014 | Broad | G01S 3/50 | 702/150 |
| 2014/0365134 A1* | 12/2014 | Eisner | G01V 1/288 | 702/14 |
| 2015/0288460 A1* | 10/2015 | Cahalan | H04B 11/00 | 367/118 |
| 2015/0341065 A1* | 11/2015 | Boehnke | H04L 7/042 | 375/316 |
| 2015/0355322 A1* | 12/2015 | Oshima | G01S 13/003 | 342/116 |
| 2016/0029142 A1* | 1/2016 | Isaac | H04S 7/301 | 381/303 |
| 2016/0119662 A1* | 4/2016 | Zinevich | H04N 21/2404 | 725/95 |

* cited by examiner

RECEIVER COMPONENT AND METHOD FOR ENHANCING A DETECTION RANGE OF A TIME-TRACKING PROCESS IN A RECEIVER

BACKGROUND

In orthogonal frequency-division multiplexing (OFDM) based single-frequency networks (SFNs), the same transmit signal is broadcasted simultaneously by various emitting towers on the same carrier frequency. The received signal at the receiver is always the superposition of all transmitted signals. Therefore, the channel impulse response contains all received signal paths, which are individually attenuated due to path loss and delayed due to their physical signal propagation.

Those SFN signals which arrive at the receiver within the timespan of the guard interval contribute to the wanted signal energy. However, those signal parts which arrive outside of the guard interval contribute to inter-symbol-interference, and thus disturb the wanted signal reception.

In a mobile environment, the attenuation of the received SFN signal contributions are continuously changing and fading. Therefore, the time-tracking algorithm at the receiver side is in charge to adjust the timing position for the fast Fourier transform (FFT) window extraction such that the signal-to-interference-plus-noise ratio (SINR) is maximized. For out-of guard channels, this means that the time-tracking algorithm needs to monitor all relevant signal contributions over time, and move the FFT window position accordingly.

For a digital audio broadcasting (DAB) or DAB Plus (DAB+) receiver, the time-tracking algorithm is carried out on an a-priori known preamble symbol, e.g., TFPR symbol. A cross-correlation of the received signal with the perfectly known preamble provides the channel impulse response at the receive antenna. However, the cross-correlation of the preamble symbol has a limited detection range of $\pm FFT\_SIZE/2$. Thus, all delay taps which fall within the above detection range can be detected reliably. However, delay taps outside of the detection range become ambiguous and cannot be detected reliably or may even be misinterpreted. In addition, the correlation detection range can also be asymmetric e.g. $-FFT\_SIZE/4$, $FFT\_SIZE*3/4$, which may be difficult to model the power delay profile of the channel impulse response.

SUMMARY

A receiver component and a method for enhancing a detection range of a time synchronization process in a receiver utilize multiple cross-correlations of a received signal with a known preamble sequence. The results of the multiple cross-correlations are divided into delay segments. The delay segments of one of the multiple cross-correlations are compared with the delay segments of another of the multiple cross-correlations to determine delay of the delay segments of the one of the multiple cross-correlation results.

In an embodiment, a method for enhancing a detection range of a time synchronization process in a receiver comprises performing multiple cross-correlations on different portions of a received signal with a known preamble sequence to derive multiple cross-correlation results, dividing each of the cross-correlation results into a plurality of delay segments, and comparing the delay segments of one of the multiple cross-correlation results with the delay segments of another of the multiple cross-correlation results to determine delay of the delay segments of the one of the multiple cross-correlation results.

In an embodiment, a method for enhancing a detection range of a time synchronization process in a digital audio broadcasting based receiver comprises performing first and second cross-correlations on a received signal with a known preamble sequence to derive first and second cross-correlation results, wherein the second cross-correlation is time-shifted with respect to the first cross-correlation, dividing each of the first and second cross-correlation results into a plurality of delay segments, and comparing magnitude of the delay segments of the first cross-correlation results with magnitude of the delay segments of the second cross-correlation results to determine delay of the delay segments of the first cross-correlation results.

In an embodiment, a component of a receiver comprises a plurality of cross-correlation modules configured to perform multiple cross-correlations on different portions of a received signal with a known preamble sequence to derive multiple cross-correlation results, a plurality of division modules coupled to the plurality of cross-correlation modules, the division modules being configured to divide each of the cross-correlation results into a plurality of delay segments, and an ambiguity resolution module configured to compare the delay segments of one of the multiple cross-correlation results with the delay segments of another of the multiple cross-correlation results to determine delay of the delay segments of the one of the multiple cross-correlation results.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments of the invention enable a receiver that receives signals with a-priori known preambles, such as DAB/DAB+receivers, to increase the detection range of the time-tracking process or algorithm performed in the receiver. As described in more detail below, embodiments of the invention utilize multiple time-shifted cross-correlation of the received signal to enhance the detection range. In addition, in one or more embodiments of the invention resolves ambiguity that arise from using multiple cross-correlation results of the same receive signal.

Figure 1:
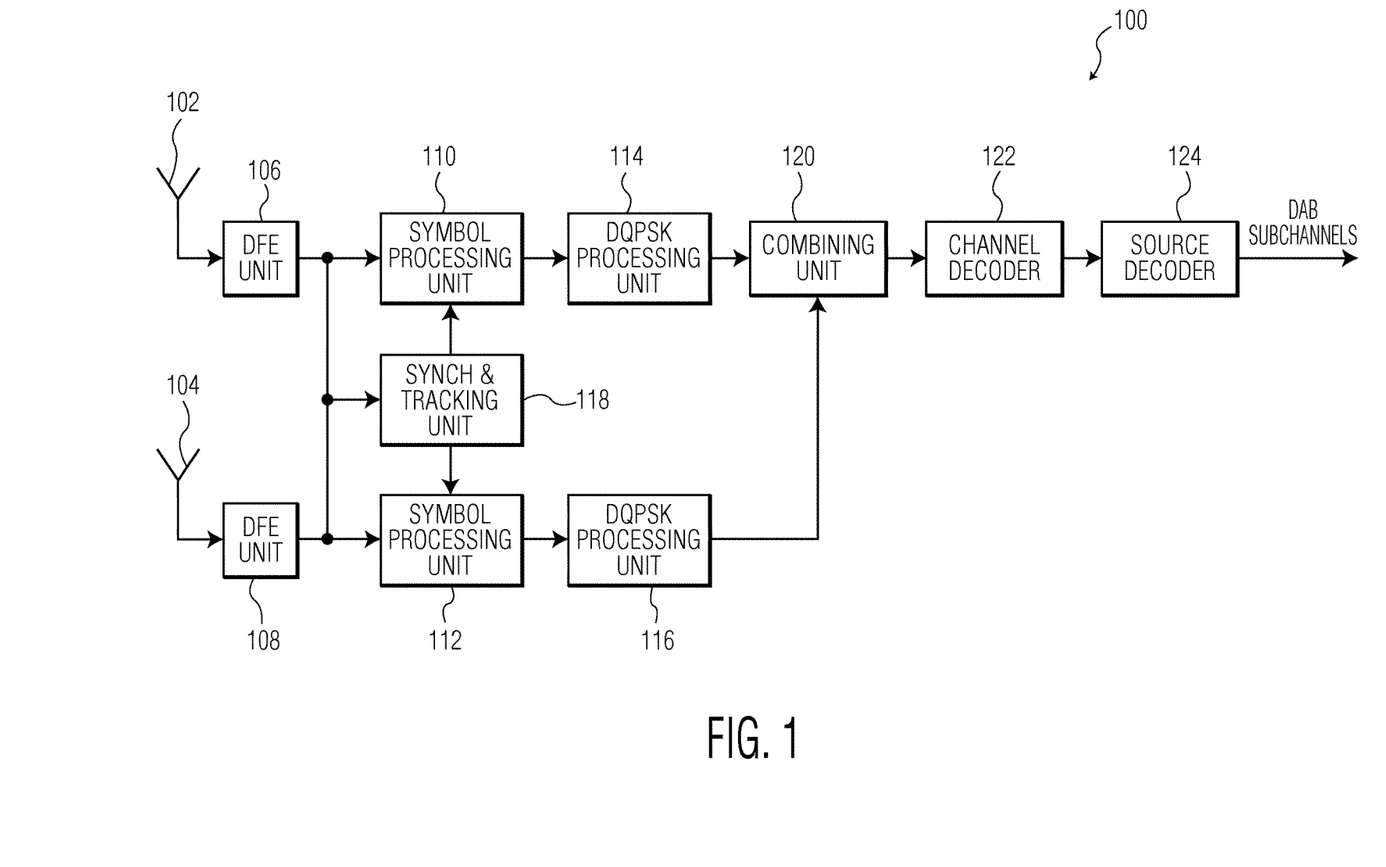
FIG. 1 depicts a schematic block diagram of a dual tuner receiver in accordance with an embodiment of the invention.

FIG. 1 is a schematic block diagram of a dual tuner receiver 100 in accordance with an embodiment of the invention. In the embodiment depicted in FIG. 1, the dual tuner receiver is a digital audio broadcast (DAB) based receiver that includes antennas 102 and 104, digital front-end processing (DFE) units 106 and 108, symbol processing units 110 and 112, differential quaternary phase-shift keying (DQPSK) processing units 114 and 116, a synchronization and tracking unit 118, a combining unit 120, a channel decoder 122 and a source decoder 124. These components of the dual tuner receiver may be implemented in any combination of hardware, software and firmware.

The dual tuner receiver 100 has two receive paths. The first receive path is provided by the antenna 102, the digital front-end processing unit 106, the symbol processing unit 110 and the DQPSK processing unit 114. The digital front-end processing unit 106 processes the signal received via the antenna 102. The digital front-end processing unit 106 performs front-end signal processes such as analog-to-digital conversion, automatic gain control and automatic frequency control. The symbol processing unit 110 extracts symbols from the received signal using time synchronization and tracking information provided by the synchronization and tracking unit 118, which is described below. The DQPSK processing unit performs DQPSK demodulation, as well as log-likelihood ratio (LLR) computation.

The second receive path is provided by the antenna 104, the digital front-end processing unit 108, the symbol processing unit 112 and the DQPSK processing unit 116. The digital front-end processing unit 108, the symbol processing unit 112 and the DQPSK processing unit 116 operate on the signal received via the antenna 104 in a similar manner as the digital front-end processing unit 106, the symbol processing unit 110 and the DQPSK processing unit 114 for the first receive path. In particular, the symbol processing unit 112 extracts symbols from the received signal on the second receive path using time synchronization and tracking information provided by the synchronization and tracking unit 118.

The combining unit 120 of the dual tuner receiver 100 operates to combine the received signals on the first and second receive paths. The combining process may be a maximal-ratio combining (MRC) process or an equal-gain combining (EQC) process. The channel decoder 122 then performs a channel decoding process, which may involve de-scrambling, de-interleaving and Viterbi decoding. Lastly, the source decoder 124 performs a source decoding process, which may involve de-multiplexing and audio decoding. The output of the source decoder is the desired audio signal.

As noted above, the synchronization and tracking unit 118 provides time synchronization and tracking information to the symbol processing units 110 and 112 on the two receive paths. The synchronization and tracking unit operates to detect a-priori known preambles of OFDM symbols in the received signals by cross-correlating the received signals with the known preamble. However, single cross-correlation of the received signal with the known preamble has an undesirable detection range, which is described below.

Figure 2:
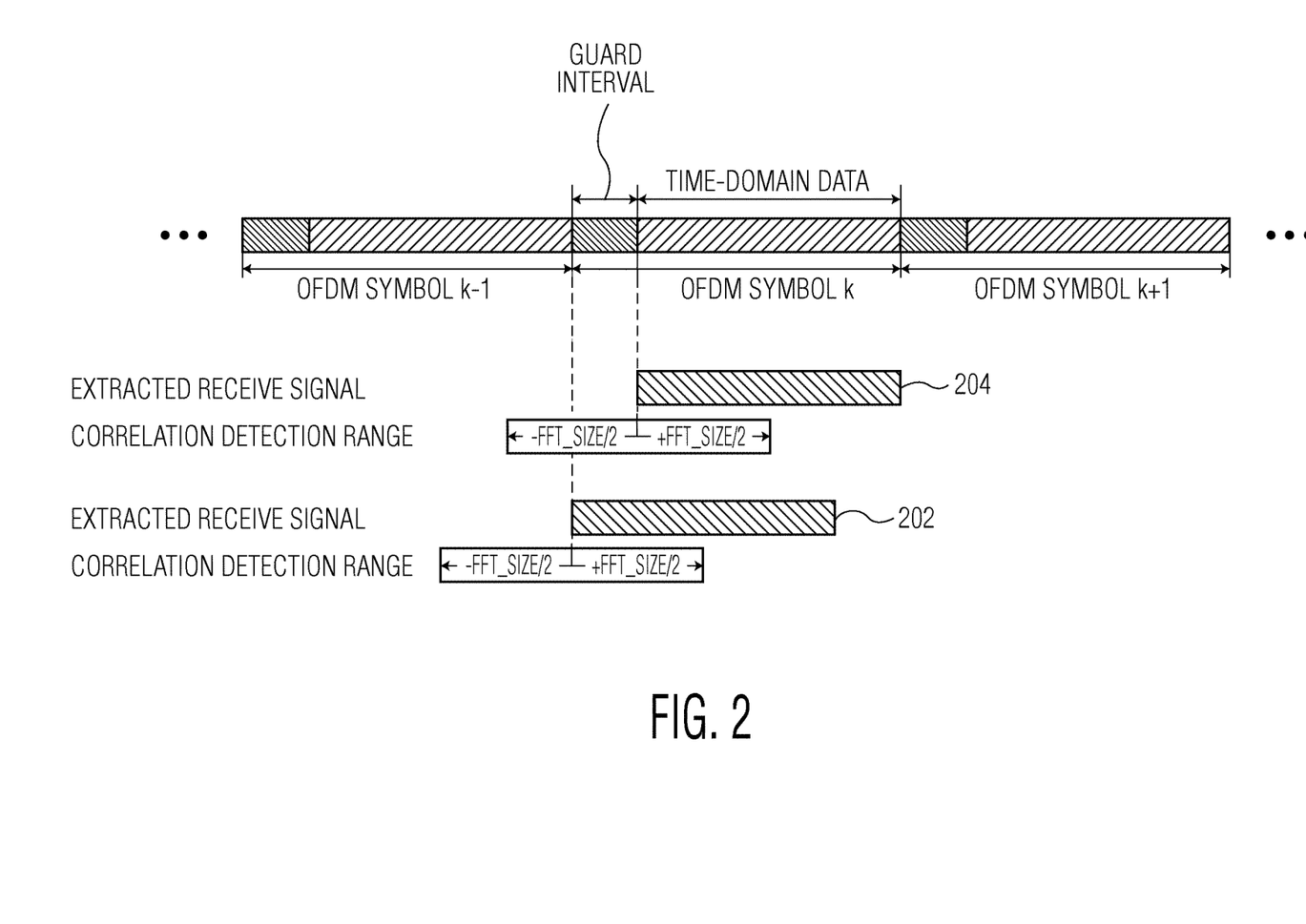
FIG. 2 depicts an OFDM symbol structure in the time-domain in which single cross-correlation is used for a time-tracking process.

Turning now to FIG. 2, an OFDM symbol structure in the time-domain is shown. As shown in FIG. 2, an OFDM signal includes a number of OFDM symbols, e.g., OFDM symbol k−1, OFDM symbol k, and OFDM symbol k+1, each of which includes a guard interval. Assuming that the OFDM symbol k contains a preamble symbol, which is a-priori known at the receiver, the time-tracking process is implemented based on a cross-correlation between the extracted received signal and the known preamble sequence. In FIG. 2, two extracted receive signals 202 and 204 are shown. The lower extracted receive signal 202 is aligned with the left side of the guard interval for the OFDM symbol k, while the upper extracted receive signal 204 is aligned with the right side of the guard interval for the OFDM symbol k. The detection range of the cross-correlation for each of the extracted receive signal is limited to ±FFT_SIZE/2. However, due to the fact that the absolute timing position can vary within the guard interval, the catch range of the time-tracking process is effectively reduced by the guard interval. Thus, using cross-correlation between the extracted received signal and the known preamble sequence, the catch range for out-of-guard channel taps is limited to ±(FFT_SIZE/2−guard interval).

In SFN networks, out-of-guard channel scenarios may occur, when for instance the local SFN tower is hidden (e.g. in a mountain area) and then SFN service is received from a far-way SFN station. In this situation, the time-tracking process of an OFDM receiver must be capable of monitoring channel impulses which may exceed the guard interval. However, the catch range of the time-tracking algorithm at the receiver limits the reception capabilities, which may result in the loss of the SFN service.

In order to enlarge the catch range of the time-tracking process, the synchronization and tracking unit 118 performs multiple time-shifted cross-correlations of the received signal with an a-priori known preamble symbol. The results of the different time-shifted cross-correlations are then used to resolve ambiguity issues for the channel delay.

Figure 3:
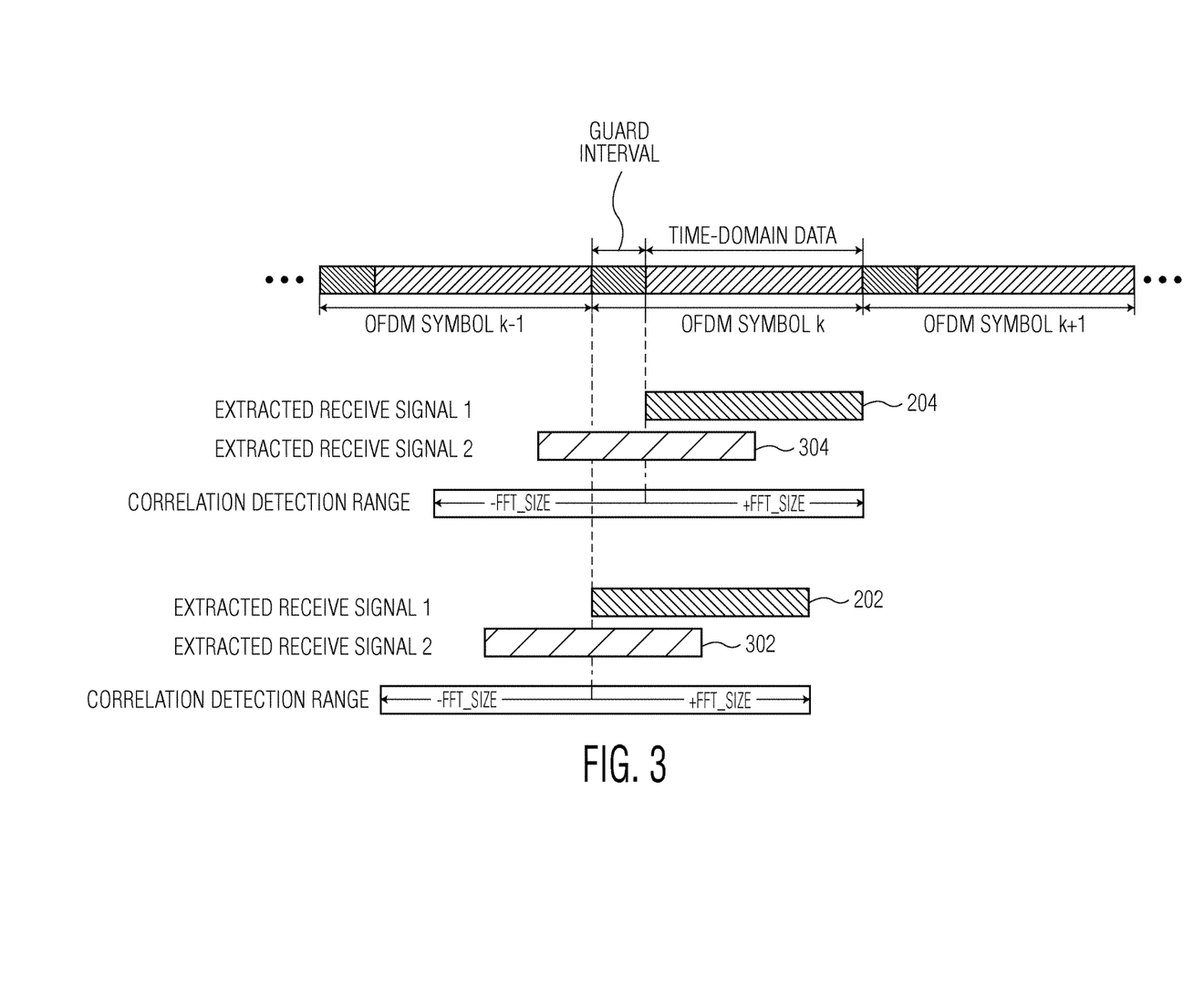
FIG. 3 depicts an OFDM symbol structure in the time-domain in which two (2) cross-correlations are used for the time-tracking process in accordance with an embodiment of the invention.

In an embodiment, the synchronization and tracking unit 118 computes two (2) time-shifted cross-correlations of the received signal with the known preamble, e.g., a Time-Frequency-Phase-Reference (TFPR) symbol, which is used in DAB/DAB+, as illustrated in FIG. 3, to increase the catch range of the time-tracking process. In FIG. 3, the same OFDM signal shown in FIG. 2 is used to illustrate the time-tracking process or algorithm. In addition, the same two extracted receive signals 202 and 204 are shown in FIG. 3. However, in this embodiment, each of the two extracted receive signals is associated with one of two (2) second extracted receive signals 302 and 304. The time shift or time difference between the two cross-correlations for the first extracted receive signal and the associated second receive signal is set to fast Fourier Transform size divided by 2 (FFT_SIZE/2) or half of FFT_SIZE. For DAB, the FFT_SIZE is mode dependent and can be either 256, 512, 1024 or 2048.

Both cross-correlations provide the channel impulse response but shifted by the time shift of FFT_SIZE/2. The total time span of the associated first and second extracted receive signals together exceeds an OFDM symbol duration. For the channel impulse response, this means that the magnitude of the correlation results of both of the associated first and second cross-correlations depends on the overlap of the extracted received signal with the actual received delay taps, which are in the cross-correlation results. In cross-correlation results with FFT_SIZE values, the delay taps show up as signal peaks above a noise threshold. The position of the peak corresponds to the signal delay and the magnitude corresponds to the received signal power. For channel delay taps with a delay>0, the magnitude of the first cross-correlation is greater than the magnitude of the second cross-correlation. For channel delay taps with a delay<=−FFT_SIZE/2, the magnitude of the first cross-correlation is smaller than the magnitude of the second cross-correlation. These characteristics of the cross-correlation results are used to resolve ambiguity issues for the channel delay, as described below.

Figure 4:
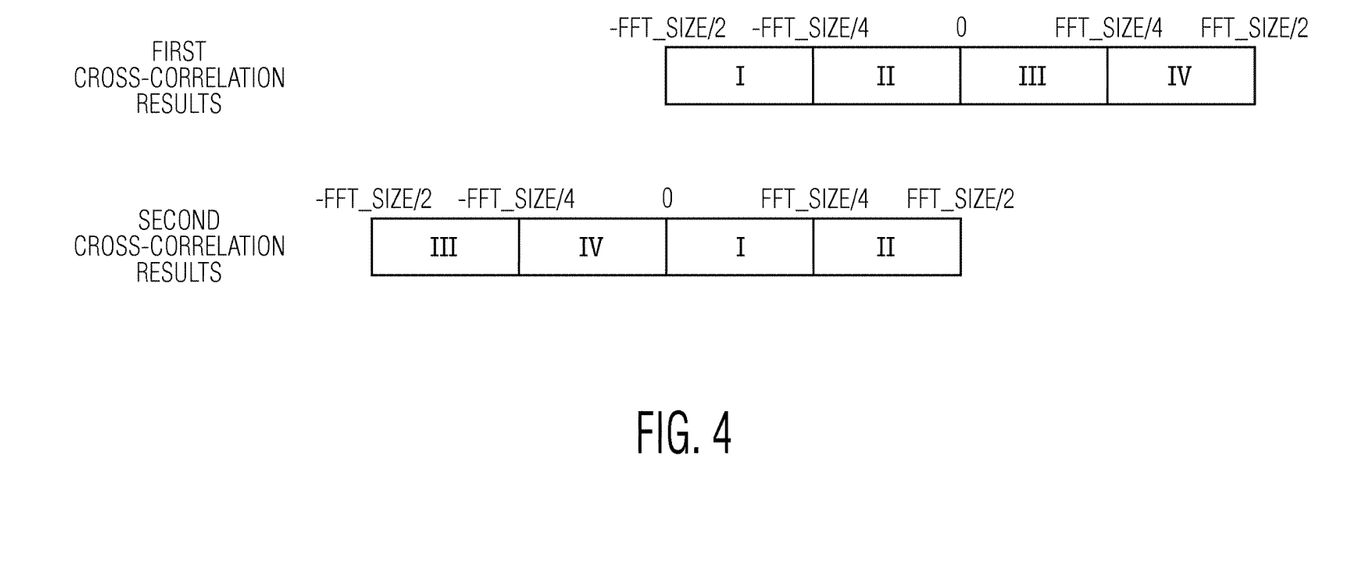
FIG. 4 depicts first and second cross-correlation results, each of which has been divided into four (4) delay segments I, II, III and IV in accordance with an embodiment of the invention.

In order to resolve the ambiguity issues, as illustrated in FIG. 4, each of first and second cross-correlation results is divided into four (4) delay segments I, II, III and IV. As shown in FIG. 4, each delay segment is of length FFT_SIZE/4 or quarter of FFT_SIZE. For the first and second cross-correlation results, the delay taps below to the four (4) delay segments I, II, III and IV as follows:

| Delay Segments | Delay Taps for First Cross-Correlation | Delay Taps for Second Cross-Correlation |
|---|---|---|
| I | −FFT_SIZE/2 . . . −FFT_SIZE/4 − 1 | 0 . . . FFT_SIZE/4 − 1 |
| II | −FFT_SIZE/4 . . . −1 | FFT_SIZE/4 . . . FFT_SIZE/2 − 1 |
| III | 0 . . . FFT_SIZE/4 − 1 | −FFT_SIZE/2 . . . −FFT_SIZE/4 − 1 |
| IV | FFT_SIZE/4 . . . FFT_SIZE/2 − 1 | −FFT_SIZE/4 . . . −1 |

Due to the time shift of FFT_SIZE/2 for the second extracted signal, the second cross-correlation results contain the same delay taps as in the first cross-correlations results but at a position cyclically shifted by FFT_SIZE/2 and with a different magnitude. The delay segments I, II, III and IV for the second cross-correlation results have also been cyclically shifted by FFT_SIZE/2. This means that for both cross-correlation results, the same delay taps are contained in the same delay segments I, II, III and IV. Considering only a single cross-correlation, the resolution of the delay taps is limited to −FFT_SIZE/2 FFT_SIZE/2−1. Due to the cyclic nature of the cross-correlation, those delay taps which exceed the above range will occur in the cross-correlation results but at a position which is cyclically shifted by FFT_SIZE. For instance, delay taps of FFT_SIZE/2 . . . FFT_SIZE*3/4 will occur in the first cross-correlation results at delay segment I. Thus, for enlarging the catch range of the time-tracking algorithm, an ambiguity resolution is required which allows for reliable detection of delay taps within −FFT_SIZE . . . FFT_SIZE−1.

Figure 5:
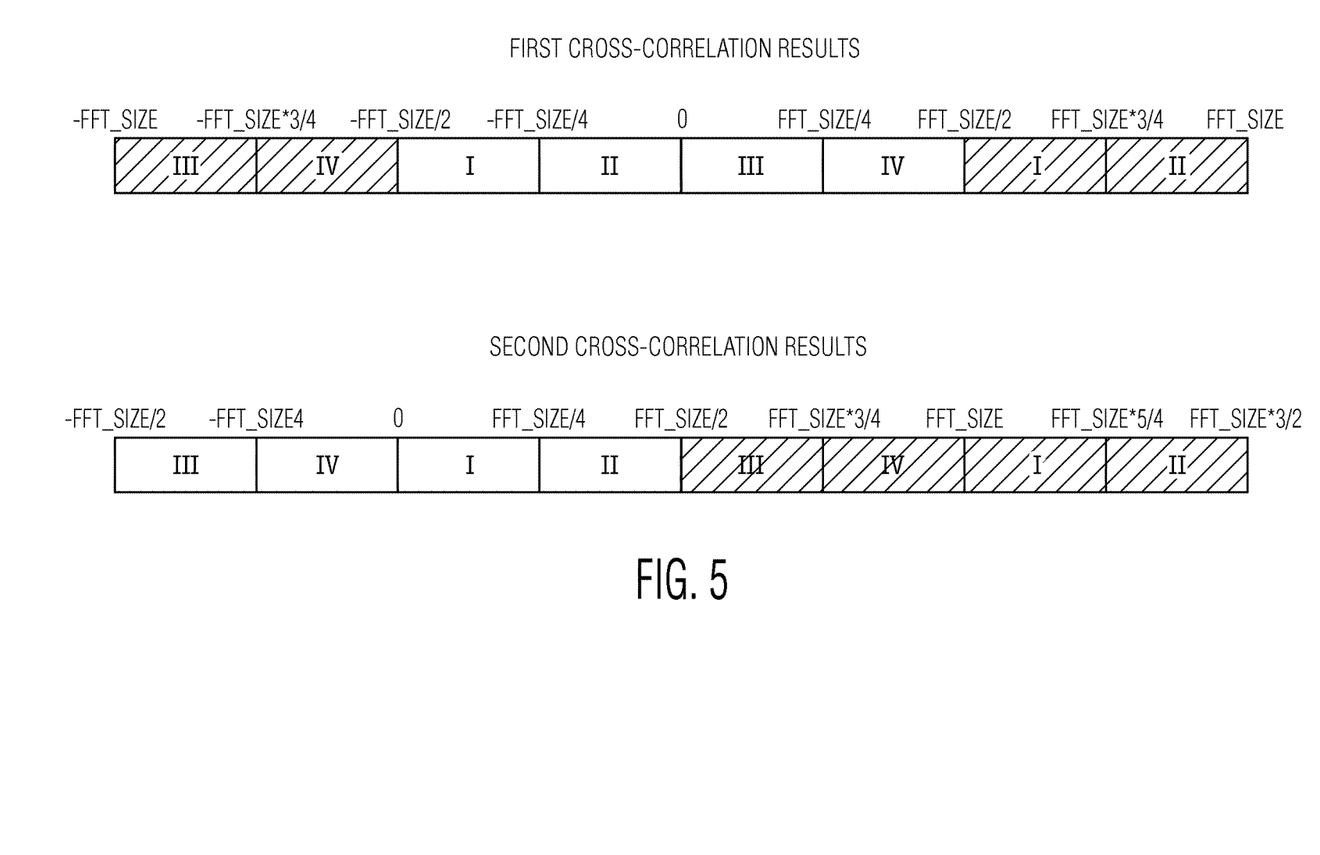
FIG. 5 depicts first and second cross-correlation results, which have been virtually extended.

The ambiguity resolution performed by the synchronization and tracking unit 118 is described with reference to FIG. 5. In FIG. 5, the first cross-correlation results are virtually extended to cover delay taps in a range −FFT_SIZE . . . FFT_SIZE for the first cross-correlation results, and −FFT_SIZE/2 . . . FFT_SIZE*3/2 for the second cross-correlation results, respectively.

For ambiguity resolution in the first cross-correlation results, the delay taps in each delay segment have to be mapped to two (2) possible destinations. As an example, the delay taps in a first delay segment for the first cross-correlation results may be mapped to the left delay segment I interval (−FFT_SIZE/2 . . . FFT_SIZE/4−1) or to the right delay segment I interval (FFT_SIZE/2 . . . FFT_SIZE·3/4−1). This is simply due to the nature of cross-correlation in that the physical channel delay taps from both intervals totally overlap in the first cross-correlation results and cannot be separated using only the first cross-correlation results. One way to separate the physical channel delay taps is to use the second time-shifted cross-correlation results in which the same channel delay taps exist. The two destinations or intervals are selected by comparing the magnitude of the first cross-correlation results and the magnitude of the second cross-correlation results. The magnitude of cross-correlation results depends on accumulated signal energy in the extracted receive signal.

For each delay tap (d1) in the first cross-correlation results ("xCorr1(d1)"), the ambiguity issue is resolved by magnitude comparison with the corresponding correlation results, i.e., the delay tap (d2) in the second cross-correlation results ("xCorr2(d2)"), as follows:

| Delay Segment of xCorr1 | Decision Criteria | Delay After Ambiguity Resolution |
|---|---|---|
| I | $|xCorr1(d_1)| < |2 \cdot xCorr2(d_2)|$ | If true: $-FFT\_SIZE/2 \ldots -FFT\_SIZE/4 - 1$<br>If false: $FFT\_SIZE/2 \ldots FFT\_SIZE \cdot 3/4 - 1$ |
| II | $|xCorr1(d_1)| < |8 \cdot xCorr2(d_2)|$ | If true: $-FFT\_SIZE/4 \ldots -1$<br>If false: $FFT\_SIZE \cdot 3/4 \ldots FFT\_SIZE - 1$ |
| III | $|xCorr1(d_1)| > |xCorr2(d_2)|$ | If true: $0 \ldots FFT\_SIZE/4 - 1$<br>If false: $-FFT\_SIZE \ldots -FFT\_SIZE \cdot 3/4 - 1$ |
| IV | $|xCorr1(d_1)| > |xCorr2(d_2)|$ | If true: $FFT\_SIZE/4 \ldots FFT\_SIZE/2 - 1$<br>If false: $-FFT\_SIZE \cdot 3/4 \ldots -FFT\_SIZE/2 - 1$ |

In the above table, for each of the delay segments I, II, III and IV, the magnitude of each of the delay taps in the delay segment of the first cross-correlations results is compared with the magnitude of the corresponding delay taps in the same delay segment of the second cross-correlation results to determine the delay for that delay tap in the delay segment of the first cross-correlations results. As an example, for the delay segment I, the magnitude of each of the delay taps in the delay segment I of the first cross-correlations results is compared with the magnitude of the corresponding delay taps in the delay segment I of the second cross-correlation results to determine the delay for that delay tap in the delay segment I of the first cross-correlations results. The decision criteria are derived from simulations.

After ambiguity resolution, the reliable detection range of both cross-correlations together is increased to ±FFT_SIZE. Due to the uncertainty of the absolute timing position within the guard interval, the effective catch range of the time-tracking algorithm is increased to ±(FFT_SIZE −guard interval).

Figure 6:
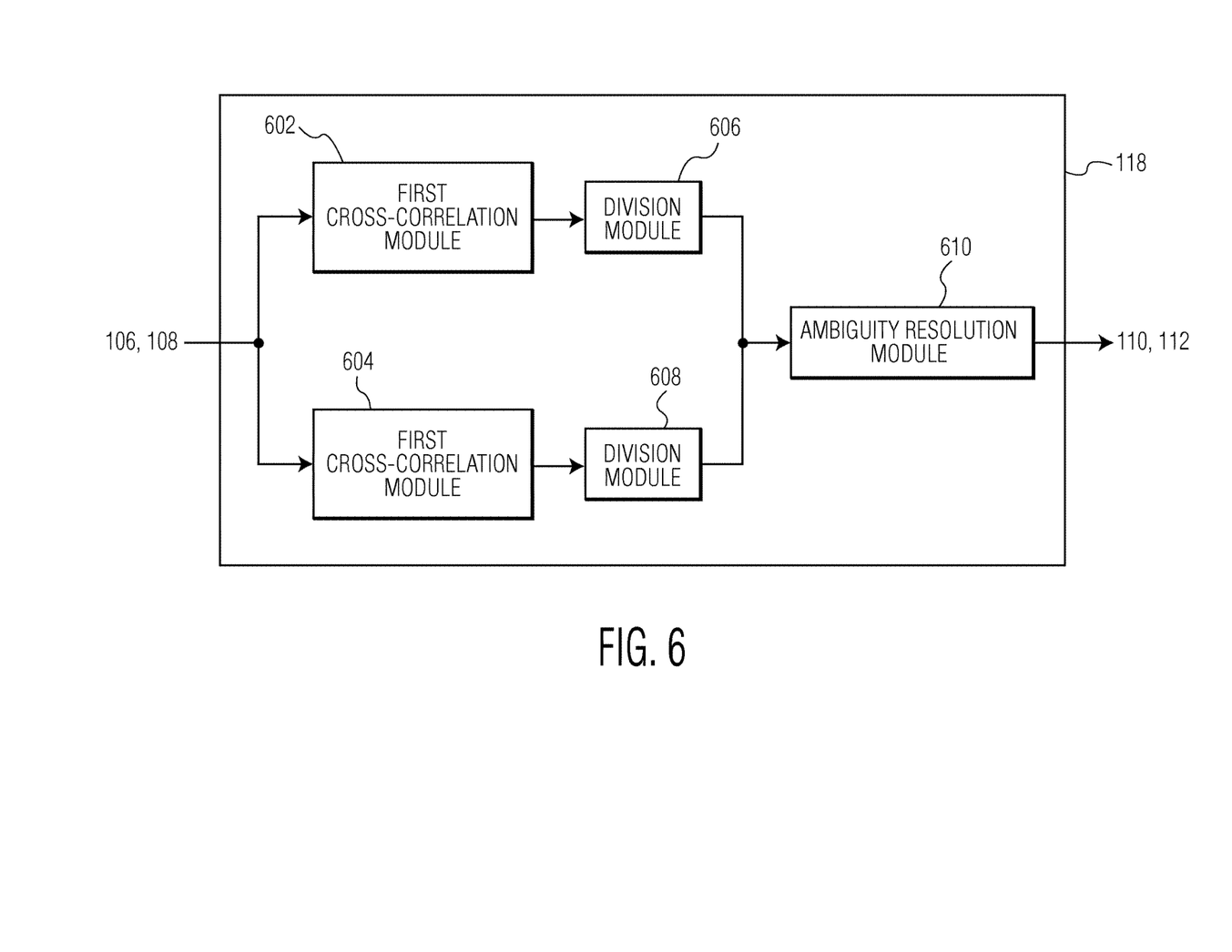
FIG. 6 depicts a block diagram of components of a synchronization and tracking unit of the dual tuner receiver in accordance with an embodiment of the invention.

Turning now to FIG. 6, components of the synchronization and tracking unit 118 are shown in accordance with an embodiment of the invention. As shown in FIG. 6, in this embodiment, the synchronization and tracking unit includes 118 first and second cross-correlation modules 602 and 604, first and second division modules 606 and 608, and an ambiguity resolution module 610. These components of the synchronization and tracking unit may be implemented in any combination of hardware, software and firmware. In a particular embodiment, the components of the synchronization and tracking unit are implemented as one or more software programs running on a system-on-chip.

The first cross-correlation module 602 performs cross-correlation between the received signal and the a-priori known preamble, e.g., TFPR symbol. The first division module 606 then divides the results from the first cross-correlation results into a number of delay elements. In an embodiment, the first cross-correlation results are divided into four (4) delay segments I, II, III and IV, as described above.

The second cross-correlation module 604 also performs cross-correlation between the received signal and the a-priori known preamble. However, this second cross-correlation is performed at a later time than the first cross-correlation. That is, the second cross-correlation is time-shifted with respect to the first cross-correlation. Similar to the first division module 606, the second division module 608 then divides the results from the second cross-correlation results into a number of delay elements. In an embodiment, the second cross-correlation results are also divided into four (4) delay segments I, II, III and IV, as described above.

The ambiguity resolution module 610 operates to resolve ambiguity issues for the channel delay by comparing the magnitude of the first cross-correlation results with the magnitude of the second cross-correlation results for each delay segment of the first cross-correlation results, as described above.

Although embodiments of the invention have been described herein for two (2) time-shifted cross-correlations, the basic principle described herein can also be applied for more than two (2) cross-correlations with different time offsets, in order to further enlarge the catch range of the time-tracking algorithm. In addition, the detection range enhancing technique described herein may be applied to other communication standards which transmit a-priori known preambles, e.g., 801.11(WiFi), Universal Mobile Telecommunications System (UMTS) and Long-Term Evolution (LTE).

Figure 7:
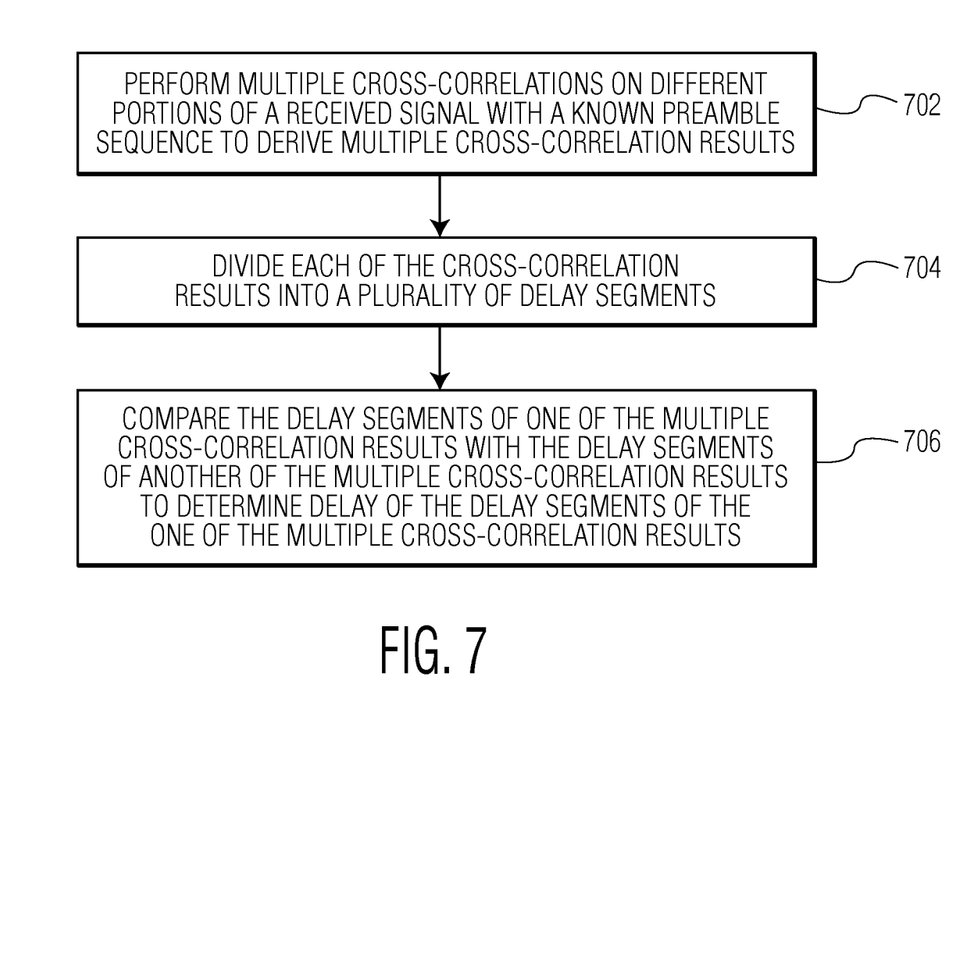
FIG. 7 depicts a flowchart diagram of one embodiment of a method for enhancing a detection range of a time-tracking process in a receiver.

FIG. 7 depicts a flowchart diagram of one embodiment of a method for enhancing a detection range of a time-tracking process in a receiver. At block 702, multiple cross-correlations are performed on different portions of a received signal with a known preamble sequence to derive multiple cross-correlation results. At block 704, each of the cross-correlation results is divided into a plurality of delay segments. At block 706, the delay segments of one of the multiple cross-correlation results are compared with the delay segments of another of the multiple cross-correlation results to determine delay of the delay segments of the one of the multiple cross-correlation results.

It should also be noted that at least some of the operations for the methods described herein may be implemented using firmware or software instructions stored on a readable storage medium for execution by a programmable logic device, such as an Application Specific Integrated Circuit (ASIC), a Field Programmable Gate Array (FPGA), a Programmable Logic Chip (PLC), a processor, or the like. As an example, an embodiment of a program product includes a firmware package stored on a flash memory device and configured to cause an FPGA to perform the operations described herein.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for enhancing a detection range of a time-tracking process in a receiver, the method comprising:
performing multiple cross-correlations on different portions of a received signal with a known preamble sequence to derive multiple cross-correlation results;
dividing each of the cross-correlation results into a plurality of delay segments; and
comparing the delay segments of one of the multiple cross-correlation results with the delay segments of another of the multiple cross-correlation results to determine delay of the delay segments of the one of the multiple cross-correlation results.

2. The method of claim 1, wherein comparing the delay segments of one of the multiple cross-correlation results with the delay segments of another of the multiple cross-correlation results includes comparing magnitudes of the delay segments of one of the multiple cross-correlation results with magnitudes of the delay segments of another of the multiple cross-correlation results to determine delay of the delay segments of the one of the multiple cross-correlation results.

3. The method of claim 1, wherein performing the multiple cross-correlations includes performing a first cross-correlation on a first portion of the received signal with the known preamble sequence and performing a second cross-correlation on a second portion of the received signal with the known preamble sequence, the second cross-correlation being performed at a later time than the first cross-correlation.

4. The method of claim 3, wherein a time difference between performing the first cross-correlation and performing the second cross-correlation is set to half of fast Fourier Transform size used by the receiver.

5. The method of claim 1, wherein dividing each of the cross-correlation results into a plurality of delay segments includes dividing each of the cross-correlation results into four delay segments.

6. The method of claim 5, wherein the length of each of the delay segment is set to quarter of fast Fourier Transform size used by the receiver.

7. The method of claim 1, wherein the known preamble sequence includes Time-Frequency-Phase-Reference (TFPR) symbol.

8. The method of claim 1, wherein the received signal is an orthogonal frequency-division multiplexing (OFDM) based signal.

9. A component of a receiver comprising:
a plurality of cross-correlation modules configured to perform multiple cross-correlations on different portions of a received signal with a known preamble sequence to derive multiple cross-correlation results;
a plurality of division modules coupled to the plurality of cross-correlation modules, the division modules being configured to divide each of the cross-correlation results into a plurality of delay segments; and
an ambiguity resolution module configured to compare the delay segments of one of the multiple cross-correlation results with the delay segments of another of the multiple cross-correlation results to determine delay of the delay segments of the one of the multiple cross-correlation results.

10. The component of claim 9, wherein the ambiguity resolution module is configured to compare magnitudes of the delay segments of one of the multiple cross-correlation results with magnitudes of the delay segments of another of the multiple cross-correlation results to determine delay of the delay segments of the one of the multiple cross-correlation results.

11. The component of claim 9, wherein the plurality of cross-correlation modules are configured to perform a first cross-correlation on a first portion of the received signal with the known preamble sequence and to perform a second cross-correlation on a second portion of the received signal with the known preamble sequence, the second cross-correlation being performed at a later time than the first cross-correlation.

12. The component of claim 11, wherein a time difference between performing the first cross-correlation and performing the second cross-correlation is set to half of fast Fourier Transform size used by the receiver.

13. The component of claim 9, wherein the plurality of division modules is configured to divide each of the cross-correlation results into four delay segments.

14. The component of claim 13, wherein the length of each of the delay segment is set to quarter of fast Fourier Transform size used by the receiver.

15. The component of claim 9, wherein the known preamble sequence includes Time-Frequency-Phase-Reference (TFPR) symbol.

16. The component of claim 9, wherein the received signal is an orthogonal frequency-division multiplexing (OFDM) based signal.

17. A method for enhancing a detection range of a time-tracking process in a digital audio broadcasting based receiver, the method comprising:
performing first and second cross-correlations on a received signal with a known preamble sequence to derive first and second cross-correlation results, wherein the second cross-correlation is time-shifted with respect to the first cross-correlation;
dividing each of the first and second cross-correlation results into a plurality of delay segments; and
comparing magnitude of the delay segments of the first cross-correlation results with magnitude of the delay segments of the second cross-correlation results to determine delay of the delay segments of the first cross-correlation results.

18. The method of claim 17, wherein a time difference between performing the first cross-correlation and performing the second cross-correlation is set to half of fast Fourier Transform size used by the receiver.

19. The method of claim 17, wherein dividing each of the first and second cross-correlation results into a plurality of delay segments includes dividing each of the first and second cross-correlation results into four delay segments.

20. The method of claim 17, wherein the known preamble sequence includes Time-Frequency-Phase-Reference (TFPR) symbol.

* * * * *